United States Patent [19]

Kutnyak

[11] 4,259,991
[45] Apr. 7, 1981

[54] HIGH PRESSURE HOSE CONSTRUCTION AND METHOD OF AND APPARATUS FOR MAKING THE SAME

[75] Inventor: Thomas A. Kutnyak, Greenwood, S.C.

[73] Assignee: Automation Industries, Inc., Greenwich, Conn.

[21] Appl. No.: 76,929

[22] Filed: Sep. 20, 1979

Related U.S. Application Data

[63] Continuation of Ser. No. 673,643, Apr. 5, 1976, abandoned.

[51] Int. Cl.³ ............................................. F16L 11/04
[52] U.S. Cl. .................................. 138/127; 138/141; 138/125; 156/149
[58] Field of Search ............... 138/124, 125, 126, 127, 138/130, 137, 141; 156/149

[56] References Cited

U.S. PATENT DOCUMENTS

| 359,222 | 3/1887 | Meacom | 138/127 |
|---|---|---|---|
| 2,829,671 | 4/1958 | Ernst et al. | 138/127 X |
| 2,962,050 | 11/1960 | Ramberg et al. | 138/127 X |
| 3,022,802 | 2/1962 | Lewis | 138/125 |
| 3,481,368 | 12/1969 | Vansickle et al. | 138/125 |
| 3,944,453 | 3/1976 | Chudgar et al. | 138/125 X |

*Primary Examiner*—James E. Bryant, III
*Attorney, Agent, or Firm*—Francis N. Carten

[57] ABSTRACT

A high pressure hose construction and method of and apparatus for making the same is disclosed wherein the hose construction has a smooth walled inner liner of resilient polymeric material, and an adhesive layer, which may also be of polymeric material bonded to the liner. A braided cover is disposed over the entire layer and embedded therein. This braided cover is comprised of a plurality of elongated intermeshing strands of non-metallic fibers, such as yarn, and metallic fibers. Preferably, every three strands are of flexible, non-metallic fibers, such as nylon fibers, and every fourth strand is of metallic fiber, such as piano wire or spring steel. One set of strands crosses over and under another set to produce an intermeshing or weaving effect. These strands may also extend in a direction at an angle, such as 45° or 53°, to the longitudinal axes of the liner, to improve the bend radius and prevent ballooning or extensions or the like of the finished hose construction when used in high pressure applications.

7 Claims, 3 Drawing Figures

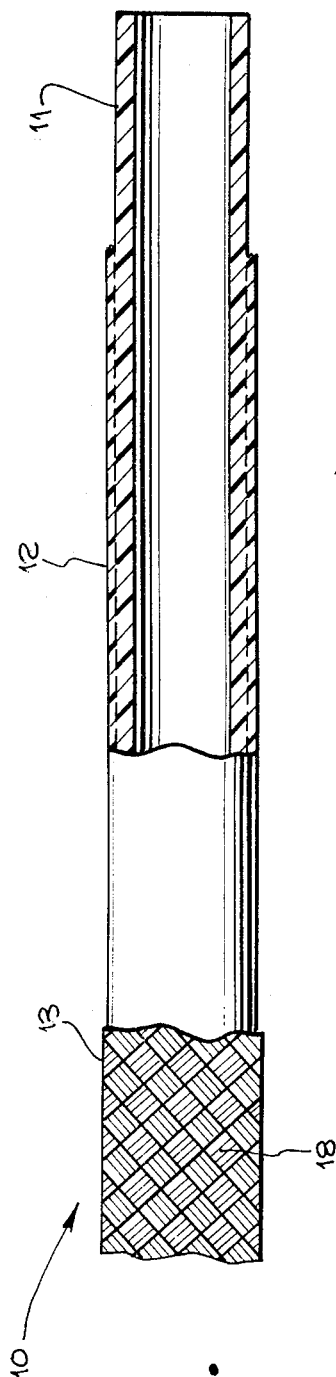
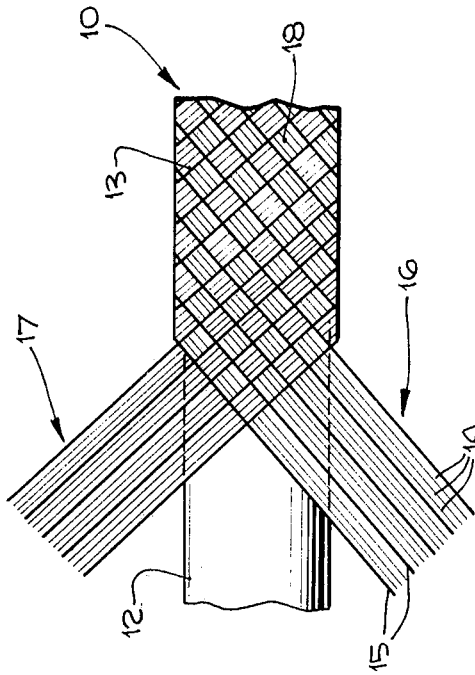
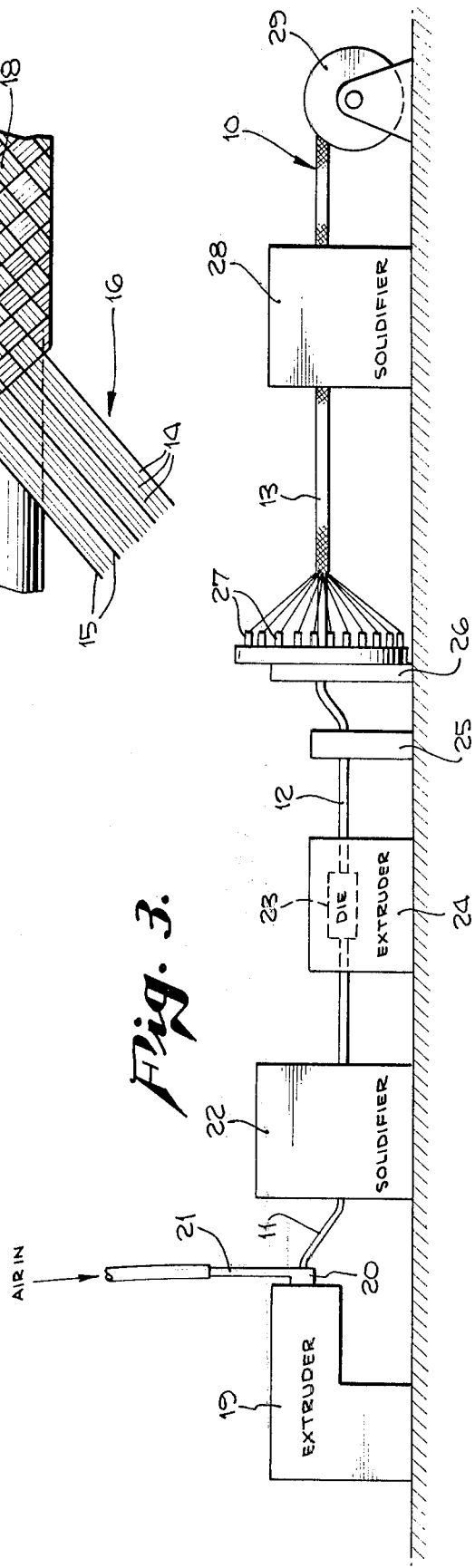

HIGH PRESSURE HOSE CONSTRUCTION AND METHOD OF AND APPARATUS FOR MAKING THE SAME

CROSS-REFERENCE TO RELATED APPLICATION

This is a continuation of my copending application Ser. No. 673,643, filed Apr. 5, 1976 now abandoned.

BACKGROUND

Many hose constructions exist in the prior art which may be used in high pressure applications. Such hose constructions generally fall into four general types. The first type is a simple hose construction consisting of a liner of an elastomeric material with a braided cover of fiber or metal. Such a hose construction has a large bend radius and kinks when bending. It has poor flexibility and both balloons and elongates under pressure. No adhesion is provided between the cover and liner and problems arise in fitting ends thereon due to cold-flow or compression set. Such hoses are thus generally limited to low pressure applications, have a short flexibility life and do not withstand negative pressures.

In order to minimize these problems, a second type of hose construction is known wherein the inner liner is convoluted or corrugated, the remainder of the hose construction being identical to the first type heretofore described. This second type of hose construction has a medium bend radius and restricted flow due to the configuration of the inner liner. Such convolutions or corrugations create flow turbulence and such hoses kink when bent beyond their bend radii. There is still no adhesion between the cover and the liner and the liner has a thin wall at the top of the convolutes or corrugations thus resulting in possible leakage. Such hoses also balloon and extend under pressure and, due to the linear configuration, create problems when fitting ends thereto. Finally, this second type of hose construction does not withstand negative pressures.

A third type of hose construction has been proposed to overcome or minimize the problems of the aforementioned first and second types of hose constructions. This third type of hose construction consists of a multiple reinforced hose to achieve high pressure rating and improved bend characteristics. The first ply is the liner which is of a smooth extruded elastomeric material, such as an elastomer or thermoplastic material. This liner is covered by a second ply of a braided fiber or wire material. A third ply covers the braided ply and is a thin elastomeric tie ply, such as as elastomer or thermoplastic material, which promotes adhesion between the second and fourth ply. This fourth ply is identical to the second braided ply. Finally, the entire hose is covered by a fifth ply of extruded tubular material compatible to the first or liner ply.

Although this third type of hose construction has advantages over the aforementioned first two types, it requires a thick wall due to the multiple ply lay-up and is thus heavy in weight, must be manufactured in several stages, is expensive to manufacture, has a limited bend radius, and is costly due to the materials used to make it.

Finally, a fourth type of hose construction has been suggested which is of a helical wire reinforced tube design. Such a hose has an inner liner of either sheet material or a coated fabric type. A wire helix is formed over the liner or cover at a predetermined pitch (i.e., the distance between the flytes of the wire helix). This helix is covered with a material compatible with the liner and a pre-coated cord is placed between the wire flytes. The pitch distance regulates the bend radius of the hose and the wire and cord arrangement improves the pressure rating. It is also heavy in weight and still has a relatively low pressure rating. It requires a hand lay-up process to manufacture and the materials used are expensive. Such a hose cannot crimp onto end fittings and must be manufactured in short lengths in a semi-automatic manufacturing process.

SUMMARY

The present invention provides means for overcoming the foregoing limitations and disadvantages of the known types of hose construction. More particularly, the present invention provides a hose construction and method of and apparatus for making the same which is economical and relatively easy to manufacture and highly efficient in use. In the embodiment of the invention disclosed herein, the hose construction and method of and apparatus for making the same includes a hose construction having a smooth walled inner liner of resilient polymeric and an adhesive layer bonded to the outer surface of the liner. A braided cover is disposed over the entire outer coating and embedded therein. This braided cover is comprised of a plurality of elongated intermeshing strands of non-metallic flexible fibers and metallic fibers. Preferably, every three strands are of flexible, non-metallic fibers, such as nylon or dacron fibers, and every fourth strand is of metallic fiber, such as piano wire or spring steel. One set of strands crosses over and under another set to produce an intermeshing or weaving effect. These strands may also extend in a direction at an angle, such as 45° or 53°, to the longitudinal axis of the liner, to improve the bend radius and prevent ballooning or extension or the like of the finished hose construction when used in high pressure applications.

DRAWING

FIG. 1 is a vertical, sectional view of an improved hose construction embodying one form of the present invention.

FIG. 2 is a detailed view of a portion of the hose construction of FIG. 1 showing how the strands are laid thereon; and FIG. 3 is a vertical partly schematic and partly diagrammatic, view of apparatus for making the improved hose construction of FIG. 1.

DESCRIPTION

Referring to the drawings in more detail and particularly to FIG. 1, the present invention is particularly adapted to be embodied in the hose construction 10 illustrated in FIG. 1. Hose construction 10 is preferably comprised of a smooth liner 11.

A second ply or layer 12 is bonded to the outer surface of first ply or liner 11. This second ply or layer 12 may be an adhesive or a material similar to that of liner 11. Thus, the smooth liner 11 may be composed or made of any of a variety of polymeric materials (e.g., plastic) providing the material is bendable and/or resilient, fluid impermeable and, preferably, has a high tensile strength and recovers its original dimensions after being bent or stretched. In addition, such polymers are preferably capable of being extruded and therefore it is desirable if such polymers are the thermoplastic polymers, since this type of polymer may be softened or melted by heat and regain their original properties on cooling. Although, in some instances, the term "thermoplastic polymer" is restricted to synthetic polymers, in this specification and claims, this term is meant to include not only synthetic polymers but natural polymers. The term, "thermoplastic" includes rubber (synthetic and natural) which can initially be softened and, in such a state, extruded and thereafter cured. Most preferably, the polymers used in this invention to produce the smooth liner 11 are elastomers, which, as known in the art, is a generic term for all polymers having the properties of natural or synthetic rubber. Thermoplastic polymers which can be used in the present invention are such diverse polymers as vinyl polymers, (e.g., polyvinyl chloride, polyvinyl chloride copolymers with, for example, polyvinyl acetate, and polyvinylidene chloride) polyolefins, such as polyethylene and modified polyethylenes, for example, chlorinated polyethylene; acrylics, such as polyacrylates, polymethacrylates (e.g., polymethyl methacrylate) and copolymers of acrylonitrile and butadiene; and fluorocarbon polymers, such as polytetrafluoroethylene and vinylidene fluoride-chlorotrifluoroethylene copolymers. Although rubbers were not mentioned in the foregoing list (with the exception of rubbers in the acrylic class), it has been emphasized herein before that rubbers are very useful in the present invention, such rubbers including neoprene (polychloroprene), butadieneacrylonitrile (previously mentioned under acrylics) and SBR. In the preferred exemplary embodiment, I have used teflon (polytetrofluoroethylene) as the smooth liner 11. However, it should be emphasized that any polymer (including rubbers) having the aforementioned properties is useful in the present invention.

In order to bond the smooth liner 11 to the braid cover 13, the adhesive layer 12 must be compatible with the polymer of which the liner 11 is made, and, additionally, compatible with the materials from which the braided cover is made. The adhesive layer 12 must also be flexible and bendable when in the solid or cured state. Except for the foregoing criteria, the adhesive layer 12 may be of many diverse types and it may be the same polymer as the liner 11 is made, such description of the polymer set out above with respect to liner 11 being incorporated herein by reference. The polymers or adhesive may be applied to the liner 11 as a liquid, a thick viscous mass, or as a soft solid. Those polymers which require subsequent curing are applied in the uncured state. Since the adhesive is soft liquid and the braid 13 is applied under tension, the braid is embedded in the soft rubber, liquid or thick viscous mass. When the adhesive layer 12 is cured or allowed to solidify by cooling there is formed a strong bond between the liner 11 and the braid cover 13. In the exemplary embodiment of the invention, a braided cover 13 is then embedded in the layer 12. This braided cover 13 is comprised of a plurality of intermeshing strands 14 (See FIG. 2) of flexible non-metallic fibers, such as synthetic yarn.

The yarn may be made of any suitable flexible fiber which is bendable. The fiber preferably, has high tensile strength. Exemplary of such fibers are fiberglass, nylon, polytetrafluoroethylene and other fluorocarbons such as those sold under the trademarks Aclar and Hylar; polyesters, such as polyethylene terphalate (Dacron) and acrylic fibers, such as polyacrylonitrile. It is emphasized, however, that the foregoing fibers are merely exemplary, since many other fibers can be used. Preferably, three such strands 14 are provided. Every fourth strand 15 is a rigid metallic wire, such as cres spring steel, copper coated steel, piano or other suitable metallic wire-like material. Such wire material may be any suitable dimensions, such as between about 0.015 to 0.025 inches in diameter. The spacing between the strands 15 of metallic wire may be about 0.090 inches.

As can be seen in FIG. 2, strands 14 and 15 are applied to the second ply 12 under tension in an over and under or weaving pattern with the first set 16 of strands 14, 15 being applied, for example, over the second set 17 of strands 14, 15. These sets 16 and 17 are applied at an angle of about 45° with respect to the longitudinal axis of hose construction 10. In this manner, the bend radius reaches its ultimate in design. Thus, the final woven or braided pattern of braids 18 is shown in FIGS. 1 and 2. If the strands 14 and 15 are applied at an angle of about 53°, the hose construction 10 is restrained from expanding in length or ballooning.

In this manner, the braids 18 are embedded into the bond ply 12 providing a mechanical adhesion of the bond ply or layer 12 to both braided cover 13 and liner 11.

Thus, hose construction 10 includes a smooth extruded liner 11 of a resilient polymeric material coated with a bond ply 12 to achieve adhesion to the braided cover 13. Cover 13 is a composite braid fabricated of flexible non-metallic yarn or cord and rigid wire, such as stainless spring steel, piano wire, etc. Preferably, every fourth strand 15 is wire and the first three strands 14 are flexible. This four-strand pattern is knitted in a consistent over and under or weaving pattern, as shown in FIG. 2, for an interlacing effect throughout the entire length of hose construction 10. The wire strands 15 act as a dual helix. If the knit angle is at a neutral 53°, the hose construction 10 is restrained from expanding in length or ballooning in diameter within about three percent of its original properties. When knitted at a true-bias angle of about 45°, the bend radius of hose construction 10 reaches its ultimate design. Abrasion is eliminated for the composite knit or braided cover 13 and end fittings (not shown) may be easily attached to the free ends of hose construction 10.

Although any suitable apparatus or method may be used for forming hose construction 10, preferred apparatus is shown in FIG. 3. Thus, as particularly contemplated in the present invention, the raw polymeric material, such as a thermoplastic material, for the first ply 11 is fed into a conventional extruder 19 and forced through a tubing die 20 forming a continuous round uncured liner tube of any desired wall thickness. Air pressure is applied through inlet 21 to the inside of the uncured liner 11 through die 20 thus inflating liner 11 to prevent kinking. After tube or liner 11 is extruded, it passes through a conventional solidifier 22, which may be suitable conventional curing or cooling equipment. That is, depending on the material used to form liner 11, solidifier 22 solidifies the liner 11 by either curing or cooling.

The cured tube or liner 11 is then passed through a conventional crosshead die 23 coupled to a conventional extruder 24 and an uncured polymeric bond ply 12 or adhesive layer is applied completely around tube or liner 11. Obviously, conventional hot melt or adhesive applicator may be used depending on the material used for the bond ply 12.

A conventional controller 25 then guides the tube or liner 11 coated with the bond ply 12 to a high speed braider 26. Braider 26 includes a plurality of carriers 27, every fourth carrier being a wire carrier and the three carriers therebetween being the synthetic yarn carriers. Any suitable number of carriers may be used, the spacing therebetween being suitable to braid the cover 13 as discussed hereinabove. The high speed braider 26 applies the cover 13 over ply or layer 12 under tension by weaving the strands in an over and under pattern and embeds the braid into the bond ply or layer 12. The braided tubing 11, 12, 13 is then conveyed through a conventional solidifier 28 which may be either a conventional curing or cooling facility, depending on the material used for bond ply 12. When solidified, bond ply 12 is mechanically adhered to the braided cover 13. The finished hose construction 10 may then be wound on a conventional take-up reel 29.

The high speed braider 26 may have seventy-two carriers 27 which may be divided into forty-eight and twenty-four carrier set-ups. For example, twenty-four carriers may be used for a ⅜" inside diameter hose construction and seventy-two carriers may be used for a 1¼" inside diameter hose construction. Every fourth carrier 27 is a wire carrier and the remaining carriers are standard yarn carriers. Such a set-up provides a four-end braid with every fourth strand being wire.

Once braid cover 13 is applied over the bond ply 12, the hose is subjected to the solidifier 28 for curing or cooling, as discussed, to accomplish the final bond or adhesion of braided cover 13 to the liner on tube 11. After this final solidifying step, the finished hose construction 10 is coiled onto a take-up spool or reel 29.

It can be seen that I have disclosed a new hose construction and method for forming the same. Such a hose construction has significant advantages over the prior art.

The braided cover 13 provides an extremely high internal positive pressure range. Thus, hose construction 10 can withstand high positive pressure where a spiral wire reinforcement usually is a detriment to very high pressures. There are no leakage problems due to the liner 11 being extruded. The finished hose 10 is very light in weight and may be manufactured in a continuous process. The hose 10 has an excellent bend radius or characteristic due to the angle of the knitted wire in cover 13. This is thus obtained without use of an internal spiral wire reinforcement.

Hose 10 can withstand negative pressures without collapsing, again without the need for internal spiral wire reinforcement. End fittings of all types are easily attached to hose 10. Excellent adhesion of the liner 11 to the braided cover 13 is obtained. Hose 10 will not balloon in diameter nor extend in length due to the selection of a neutral knit angle of 53°. Hose 10 can withstand external load and flow is not restricted therethrough. It has excellent abrasion resistance and may be clamped around its outside diameter without damage.

Finally, hose 10 has excellent dimensional stability which is maintained under all condition of pressure and crush. It is very high in puncture resistance and impossible to kink even under extreme bending.

Although the braider 26 has been disclosed as being adapted to apply the strands 14, 15 at an angle of about 45° or 53° with respect to the longitudinal axis of liner 11, it is to be understood that such strands 14, 15 may be applied at any desired angle, with optimum results lying within the range of from about 40° to 55°.

The advantages of the present invention, as well as certain changes and modifications to the disclosed embodiments thereof, will be readily apparent to those skilled in the art. It is the applicant's intention to cover all those changes and modifications which could be made to the embodiments of the invention herein chosen for the purposes of the disclosure without departing from the spirit and scope of the invention.

What is claimed is:

1. A high pressure hose comprising:
   (a) a unitary, smooth-walled liner of fluid-impermeable material having shape memory and high tensile strength;
   (b) a flexible adhesive layer of a material compatible with said liner material and bonded to the outer wall of said liner; and
   (c) a braided cover disposed about said outer wall of said liner and bonded thereto by said adhesive layer, said braided cover comprising a plurality of interwoven groups of strands each disposed at a bias angle from about 40° to 55° with respect to the longitudinal axis of said liner, each group of strands comprising a plurality of non-metallic fibers and a steel wire all in a side-by-side array, said steel wires each having a diameter from about 0.015 inch to about 0.025 inch.

2. A high pressure hose according to claim 1, wherein said steel wires are spaced apart from one another by about 0.090 inch.

3. A high pressure hose according to claim 1, wherein said steel wires are spring steel wires, copper-coated steel wires, or piano wires.

4. A high pressure hose according to claim 1, wherein said non-metallic fibers are formed of fiberglass, nylon, fluorocarbon, polyester, or acrylic.

5. A high pressure hose according to claim 1, wherein each of said groups of strands comprises three of said non-metallic fibers and one of said steel wires.

6. A high pressure hose according to claim 1, wherein said liner is formed of a polymer selected from the group consisting of vinyl polymers, fluorocarbon polymers, polyolefins, and acrylics.

7. A high pressure hose according to claim 1, wherein said liner is formed of a rubber selected from the group consisting of neoprene, butadieneacrylonitrile and SBR.

* * * * *